United States Patent Office 3,843,420
Patented Oct. 22, 1974

3,843,420

SPUTTERED GRANULAR FERROMAGNETIC IRON-NICKEL-SILICA FILMS

Jonathan Isaac Gittleman and Joseph John Hanak, Trenton, N.J., assignors to RCA Corporation Filed Oct. 24, 1972, Ser. No. 299,770
Int. Cl. C04b *35/00*
U.S. Cl. 148—31.55 10 Claims

ABSTRACT OF THE DISCLOSURE

Granular ferromagnetic films of an iron-nickel alloy and silica made by radio frequency sputtering of a three component target. These materials are useful for magnetic head applications. Compositions having high permeability and high resistivity are useful as integrated circuit inductor cores.

The invention hereindescribed was made in the course of or under a contract with the Government of the United States.

GRANULAR FERROMAGNETIC FILM

This invention relates to novel granular ferromagnetic films. More particularly, this invention relates to granular feromagnetic films of iron, nickel and silica.

BACKGROUND OF THE INVENTION

Granular ferromagnetic films, commonly referred to as ferromagnetic cermets, are mixtures of incompatible materials: a ceramic, which is an electrical insulator, and a metal, which is a conductor. Ferromagnetic cermets have little solubility between the metallic phase and the ceramic phase at temperatures of preparation and thus are heterogeneous materials wherein small metal grains are embedded in an amorphous insulating matrix. As such, the properties of such cermets, such as permeability and resistivity, generally vary directly with the relative proportion of metal and insulator present in the composition. Cermets are of interest for magnetic head applications, integrated circuit inductor cores for TV circuits and filters and the like.

Known cermets of silica, such as $Ni_{(1-x)}(SiO_2)_x$ and $(Fe)_{1-x}(SiO_2)_x$ are not suitable for certain applications such as integrated circuit inductor cores because they have permeabilities which are too low for materials of sufficiently high resistivity. In particular, it is desirable to be able to make an integrated circuit inductor core operating in the range 200–500 mHz. which has a resistivity greater than $10^{-3}$ ohms–cm. and a permeability in a range 30–40 or higher.

SUMMARY OF THE INVENTION

We have found that granular ferromagnetic films of nickel, iron and silica combine desirable magnetic properties with high electrical resistivity. These materials have increasing resistivity with increasing silica content, as would be expected, but they have surprisingly high permeabilities even at relatively low metal content. The films described herein are prepared by cosputtering iron, nickel and silica onto a suitable substrate in the desired amounts.

DETAILED DESCRIPTION OF THE INVENTION

Figure 1:
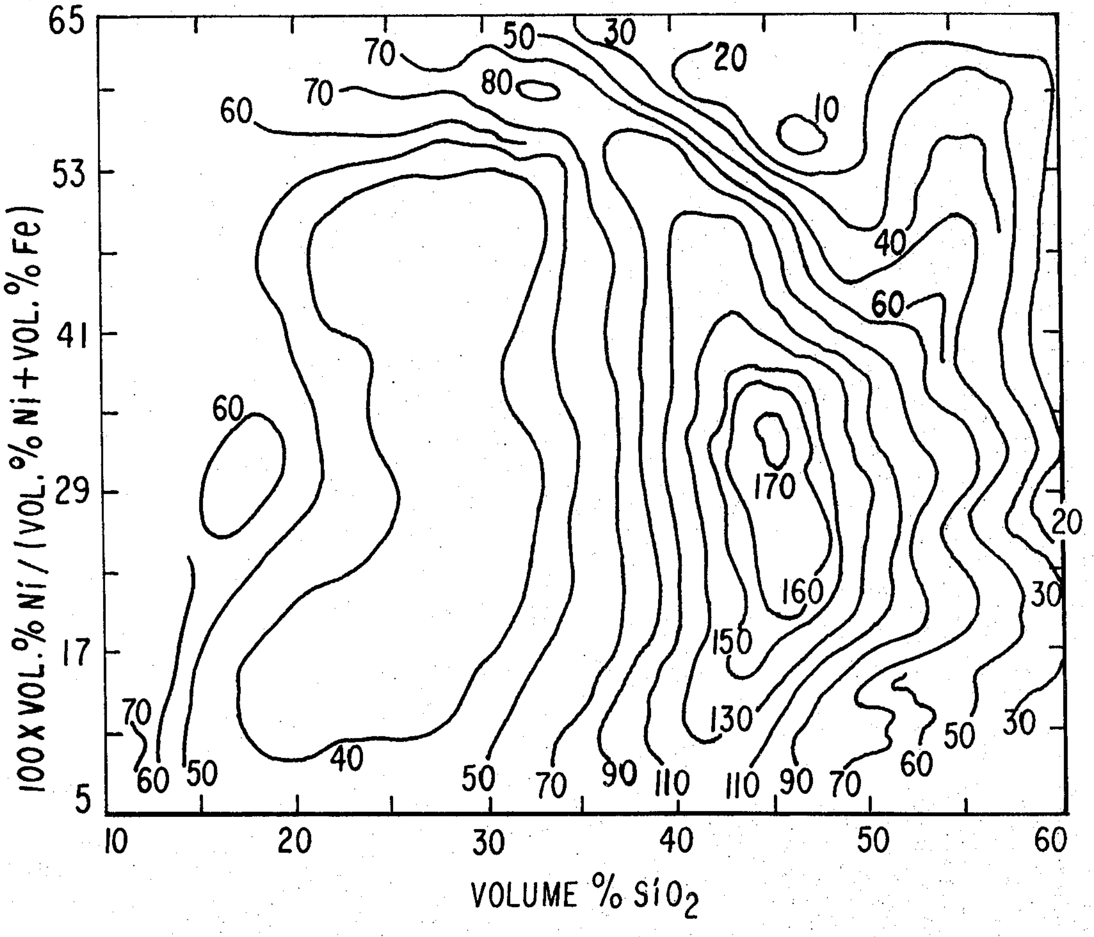
FIG. 1 is a graph of the contours of constant permeability for iron-rich iron/nickel alloy-silica cermets wherein the abscissa represents the silica concentration, given in volume percent, and the ordinate represents nickel concentration in the nickel-iron alloy, given in volume percent.

The granular ferromagnetic films hereinafter described have the composition $$(Fe_yNi_{1-y})_{1-x}(SiO_2)_x$$

wherein $x$ is from 0.001 to 0.7 parts (0.1–70%) by volume and $y$ is from 0.001 to 0.999 parts (0.1–99.9%) by volume. These compositions vary from nickel-rich materials having high permeability and comparatively low resistivity, useful for low frequency applications in the range 1–50 mHz. for cores of magnetic recording heads and inductors for TV circuits and filters, to iron-rich materials having high permeability and high resistivity useful in the range 10–1000 mHz. for thin film inductors for high frequency use in TV tuners. Preferably, the nickel-rich compositions will contain from about 40 to about 90% by volume of nickel in the nickel-iron alloy and 0.1 to about 30% by volume of silica and the iron-rich compositions will contain from about 1 to about 55% by volume of nickel in the nickel-iron alloy and from 25–60% by volume of silica. Compositions containing 40–50% by volume of silica and 15–40% by volume of nickel in the nickel/iron alloy are particularly useful for integrated circuit cores which will operate in the 200–500 mHz. range.

The above-described ferromagnetic films can be prepared by radio frequency sputtering in conventional manner onto a substrate from a target composed of sections of iron, nickel and silica. The nature of the substrate is not critical and can be of ceramic, metal, glass and the like.

The composition of the film deposited on the substrate depends on the target geometry. A continuously changing composition of the cermet can be sputtered onto the substrate, or, a uniform composition can be deposited. When a continuously changing composition is desired to be deposited, a target can be prepared by cutting sheets of nickel, iron and silica, suitably from 1/16 to 1/4 inch thick, in the form of sections of a disk and the sections placed on the surface of a sputtering cathode.

When a uniform composition is desired to be deposited, a target can be prepared by mixing nickel, iron and silica powders in the proportions desired in the sputtered film, pressing the resultant mixture in the shape of a disk target and firing the disk at an elevated temperature, e.g., 1100° C., for about an hour in a hydrogen atmosphere. Alternatively, a suitable target can also be prepared by placing strips cut from sheets of two of the components in uniform manner onto a disk of the third component, e.g., placing strips of nickel and silica on an iron target.

Methods of sputtering are more completely described in a copending application of Hanak, Ser. No. 175,587 filed Aug. 27, 1971, now abandoned.

The relative amounts of each constituent of the present ferromagnetic films required on the target to give a film of the desired composition can be calculated from the relative sputtering rates according to the method described in aforementioned application, Ser. No. 175,587.

The ferromagnetic films can be employed as sputtered, but preferably are annealed at elevated temperatures which may serve to enhance the permeability. Annealing can be carried out by heating at temperatures of from about 200° C. up to the temperature which would adversely affect the substrate. Temperatures of from about 225 to about 300° C. are suitable when using glass substrates.

The invention will be further illustrated by the following examples, but it is to be understood that the invention is not meant to be limited to the details described therein.

In the examples, permeability was determined according to the following procedure, using a magnetic recording head containing a pair of windings, one for the record/playback function and the other for the erase function. One of the windings was driven by a reference source of a phase-sensitive detector which measures the change in signal from the other winding when the head is contacted with the specimen. The signal is linearly related to the magnetic reluctance of that portion of the sample beneath the gas of the recording head. The reluctance is inversely proportional to $\mu d.$, the product of permeability and thickness. If two standards are measured, the permeability at any point $(x,y)$ of the sputtered film can be determined by the following equation:

$$[\mu(x, y)d(x, y)]^{-1}=[\mu_2 d_2]^{-1} + \frac{[(\mu_1 d_1)^{-1}-(\mu_2 d_2)^{-1}}{\Delta V_1^{-1}-\Delta V_2^{-1}}[\Delta V^{-1}(x, y)-\Delta V_2^{-1}]$$

wherein $\Delta V\ (x,y)$ is the signal and the subscripts 1,2 refer to the standards.

Example I.—Preparation of a Film of Variable Composition

A 6" diameter disk-shaped target was prepared from sheet material by fabricating into three sectors, one sector containing nickel, another iron and the third silica. The central angle subtended by each sector was 43°, 180° and 137° respectively.

The target was placed as the cathode in a radio frequency sputtering system using argon at a pressure of about 10 microns and sputtered onto a glass substrate 4.5 x 4.5 inches placed parallel to the target and spaced about 2 inches therefrom.

The sputtered film varied in composition from about 5–40% by volume of nickel, 15–80% by volume of iron and 10–60% by volume of silica.

The magnetic permeability measurements are presented in the form of contours on the graph shown in FIG. 1.

Referring now to FIG. 1, the numbers on the graph are the permeability measurements, identifying the compositions which gave such measurements. It is apparent that materials of particularly high permeability (about 130–170) which would be expected to have high resistivity contained from about 40 to about 50% by volume of silica and from about 15 to about 40% by volume of nickel in the nickel/iron alloy.

The film was annealed under vacuum ($2\times10^{-7}$ mm. Hg) for two hours at 250° C. The permeability was remeasured and it was found that for compositions having an initially low permeability, a small increase in permeability was noted after annealing. However, compositions having a high permeability initially had a greater increase in permeabilty after annealing. The composition $(Fe_{0.71}Ni_{0.29})_{0.54}(SiO_2)_{0.46}$ having an initial peak at about 170 had a permeability after annealing of 310.

Example 2.—Preparation of a Film of Variable Composition

The procedure of Example 1 was followed except substituting a target wherein the angles subtended by the nickel, iron and silica sectors were 151°, 72° and 137°, respectively.

The resultant film varied in composition from about 20–85% by volume of nickel, 5–40% by volume of iron and 10–55% by volume of silica.

The magnetic permeability was recorded in the form of contours. The results are given in FIG. 2.

Figure 2:
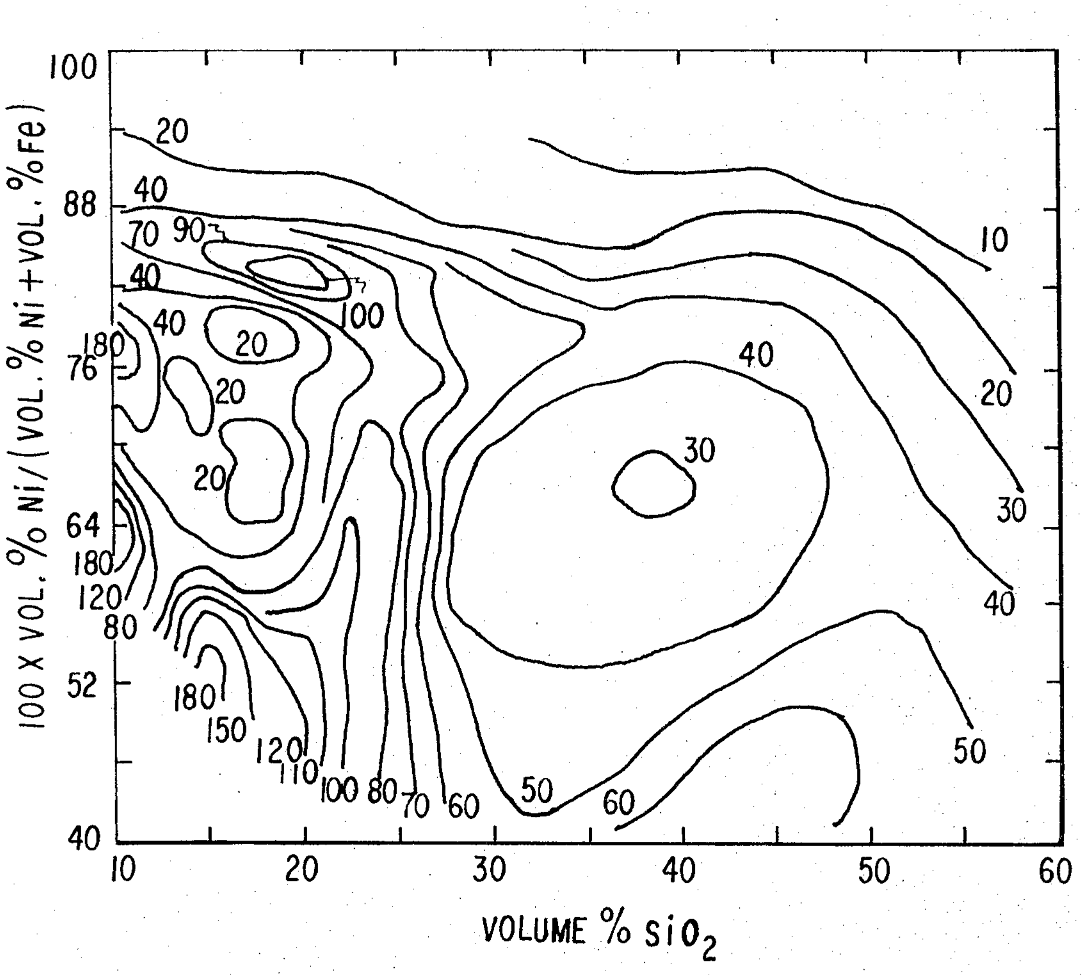
FIG. 2 is a graph of the contours of constant permeability for nickel-rich iron/nickel alloy-silica cermets wherein the abscissa and ordinate are the same as for FIG. 1.

Referring now to FIG. 2, materials having high permeability will have compositions in the range 40–65% by volume of nickel in the nickel/iron alloy and 13–20% by volume of silica.

Example 3

Figure 3:
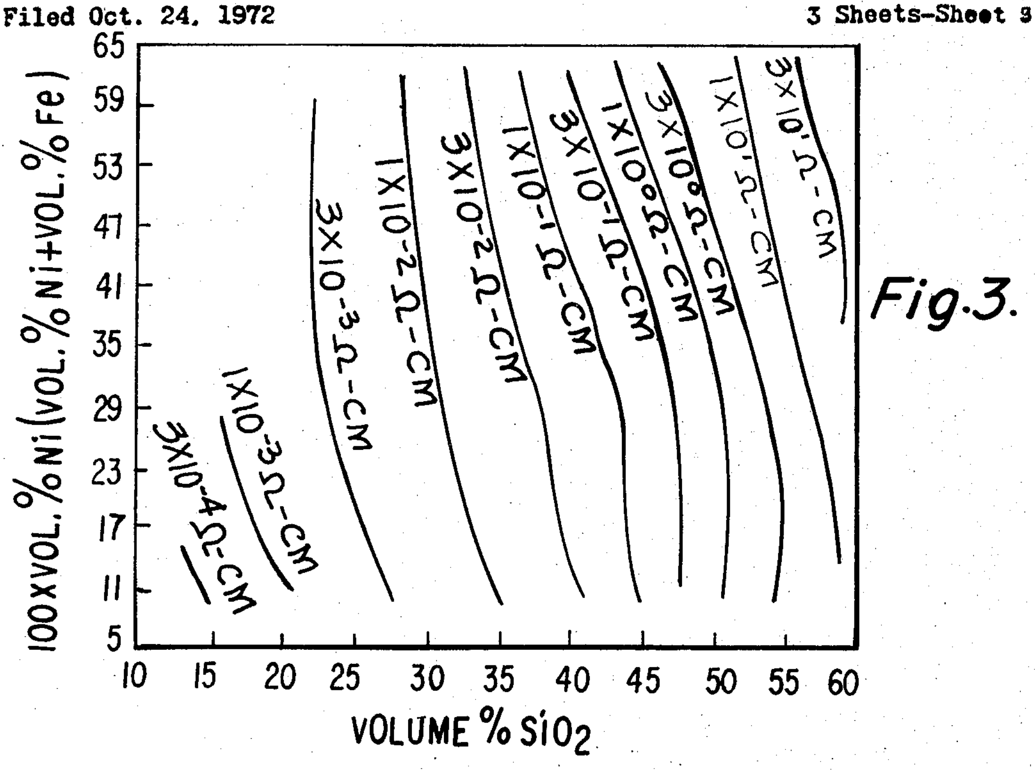
FIG. 3 is graph of the contours of constant resistivity of iron-rich iron/nickel alloy-silica cermets wherein the abscissa and ordinate are the same as for FIG. 1.
Figure 4:
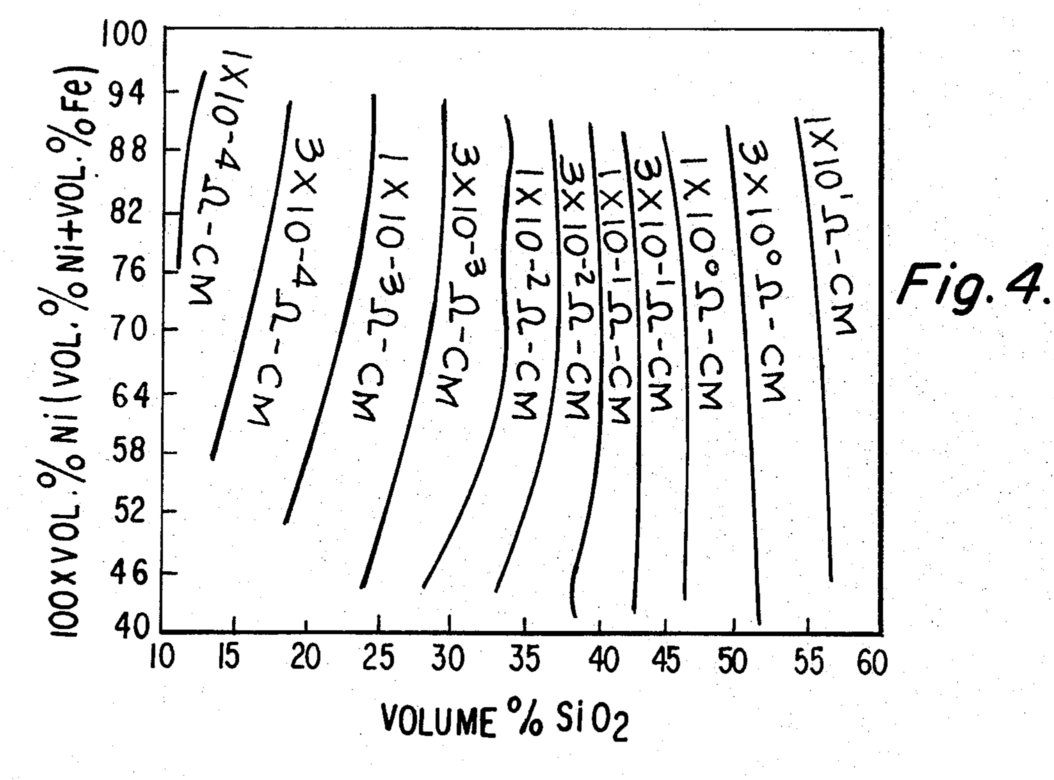
FIG. 4 is a graph of the contours of constant resistivity of nickel-rich iron/nickel alloy-silica cermets wherein the abscissa and ordinate are the same as for FIG. 1.

The resistivity in ohms-cm. of the films prepared in Examples 1 and 2 was measured by replacing the recording head used to determine permeability with a conventional 4 point probe. Resistance of the composition as a function of its position on the film was measured using a Direct Current supply in conjunction with a digital voltmeter. The outline of areas having constant resistivity are shown in FIGS. 3 and 4, wherein the resistivity measurements are shown on the graphs. FIG. 3 is a graph of the resistivity measurements of the film prepared in Example 1 and FIG. 4 is a graph of the resistivity measurements of the film prepared in Example 2.

The films were annealed under vacuum ($2\times10^{-7}$ mm. Hg) for two hours at 250° C. and resistivity remeasured. Resistivity of most of the compositions had increased by about 25%.

Example 4.—Preparation of a Film of Constant Composition

A target was prepared by admixing powders of iron, nickel and silica in a ratio by weight of 1:0.531:0.336 respectively. The mixture was pressed at 12,000 p.s.i. into the shapes of a disk six inches in diameter and about ¼ inch thick. The disk was fired at 1100° C. for one hour in hydrogen.

The resultant sputtered film had the composition $$(Fe_{0.7}Ni_{0.3})_{0.55}(SiO_2)_{0.45}$$

in parts by volume. The permeability was 150 and resistivity was $9\times10^{-2}$ ohms-cm. The film was annealed at 250° C. for two hours under vacuum and cooled to room temperature. The permeability had increased to 270 and resistivity was $1.1\times10^{-1}$ ohms-cm.

Example 5.—Preparation of a Film of Constant Composition

A target was prepared by laying strips of silica ¼ inch wide onto an iron disc in regularly spaced rows ¼ inch apart. Nickel squares ¼ x ¼ inch were placed between the silica strips about one inch apart.

The composition in parts by volume of a sputtered film which was about 3 microns in thickness was $$(Fe_{0.7}Ni_{0.3})_{0.55}(SiO_2)_{0.45}$$

This film had a permeability of 165 and a resistivity of $7\times10^{-2}$ ohms-cm.

We claim:

1. A sputtered granular ferromagnetic film consisting essentially of a composition having the formula $$(Fe_yNi_{1-y})_{1-x}(SiO_2)_x$$

wherein $x$ is from 0.001 to 0.7 part by volume and $y$ is from 0.001 to 0.999 part by volume, and further characterized by having granular particle size on the order of 10 to 200 angstroms.

2. A composition according to claim 1 wherein $x$ is from 0.001 to 0.3 and $y$ is from 0.10 and 0.60.

3. A composition according to claim 2 wherein $x$ is from 0.13 to 0.20 and $y$ is from 0.40 to 0.60.

4. A composition according to claim 1 wherein $x$ is from 0.40 to 0.50 and $y$ is from 0.60 to 0.85.

5. A composition according to claim 4 wherein $x$ is from 0.44 to 0.48 and $y$ is from 0.67 to 0.71.

6. A composition according to claim 1 wherein $x$ is about 0.45 and $y$ is about 0.70.

7. An annealed film of claim 1.

8. An annealed film of claim 2.

9. An annealed film of claim 4.

10. A annealed film of claim 6.

References Cited

UNITED STATES PATENTS

| | | | |
|---|---|---|---|
| 1,714,683 | 5/1929 | Lowry | 148—31.55 |
| 3,563,873 | 2/1971 | Beyer | 204—192 |
| 3,644,188 | 2/1972 | Sharp et al. | 204—192 |

WALTER R. SATTERFIELD, Primary Examiner

U.S. Cl. X.R.

148—100; 204—192; 252—62.59